United States Patent
Schwartz

(10) Patent No.: US 6,705,869 B2
(45) Date of Patent: Mar. 16, 2004

(54) METHOD AND SYSTEM FOR INTERACTIVE COMMUNICATION SKILL TRAINING

(76) Inventor: Darren Schwartz, 2135 N. Southport #202, Chicago, IL (US) 60614

( * ) Notice: Subject to any disclaimer, the term of this patent is extended or adjusted under 35 U.S.C. 154(b) by 103 days.

(21) Appl. No.: 09/873,849

(22) Filed: Jun. 4, 2001

(65) Prior Publication Data

US 2002/0059376 A1 May 16, 2002

Related U.S. Application Data

(60) Provisional application No. 60/209,229, filed on Jun. 2, 2000, and provisional application No. 60/246,132, filed on Nov. 6, 2000.

(51) Int. Cl.$^7$ ............... G09B 19/00; G09B 5/00; G09B 7/00
(52) U.S. Cl. ............... 434/219; 434/308; 434/323; 434/350; 434/362
(58) Field of Search ............... 434/185, 219, 434/236, 238, 252, 308, 309, 318, 319, 320, 322, 323, 335, 350, 353, 354, 362, 365, 428

(56) References Cited

U.S. PATENT DOCUMENTS

| | | | |
|---|---|---|---|
| 5,302,132 A | 4/1994 | Corder | 434/156 |
| 5,311,422 A | 5/1994 | Loftin et al. | 364/401 |
| 5,766,015 A | 6/1998 | Shpiro | 434/156 |
| 5,810,598 A | 9/1998 | Wakamoto | 434/156 |
| 5,885,083 A | 3/1999 | Ferrell | 434/156 |
| 5,978,648 A * | 11/1999 | George et al. | 434/362 |
| 6,062,862 A * | 5/2000 | Koskinen | 434/107 |
| 6,144,991 A * | 11/2000 | England | 709/205 |
| 6,288,753 B1 * | 9/2001 | DeNicola et al. | 348/586 |
| 6,293,802 B1 * | 9/2001 | Ahlgren | 434/252 |
| 6,296,489 B1 * | 10/2001 | Blass et al. | 434/185 |
| 6,301,462 B1 * | 10/2001 | Freeman et al. | 434/250 |
| 6,302,695 B1 * | 10/2001 | Rtischev et al. | 434/157 |
| 6,325,632 B1 * | 12/2001 | Chao et al. | 434/322 |
| 6,347,333 B2 * | 2/2002 | Eisendrath et al. | 709/217 |
| 6,358,053 B1 * | 3/2002 | Rosenfield et al. | 434/156 |
| 6,411,796 B1 * | 6/2002 | Remschel | 434/350 |
| 6,470,170 B1 * | 10/2002 | Chen et al. | 434/350 |
| 6,493,690 B2 * | 12/2002 | Bertrand et al. | 706/45 |
| 2003/0028378 A1 * | 2/2003 | August et al. | 704/260 |

FOREIGN PATENT DOCUMENTS

| | | |
|---|---|---|
| EP | 0 690 426 A2 | 1/1996 |
| EP | 0 690 426 A3 | 3/1997 |
| EP | 0 690 426 B1 | 8/1999 |

* cited by examiner

*Primary Examiner*—John Edmund Rovnak
(74) *Attorney, Agent, or Firm*—Gifford, Krass, Groh, Sprinkle, Anderson & Citkowski, PC

(57) ABSTRACT

A system and method for interactive communications skill training is provided. The system includes a user computer system having a memory, a display device, an input device, a video recording device and an audio device. The system also includes an e-learning web site with skill training software for interactively teaching a skill, that is in communication with the user's computer system via a communications network. The system further includes an expert's computer system. The method for interactive communications skill training includes the steps of accessing the e-learning web site by the user, selecting a learning module for a communication skill by the user, interacting with the learning module and recording the user interaction using the video recording device. The method also includes the steps of analyzing the user interaction by an expert and providing the expert analysis to the user via the communication network for review by the user to interactively learn the communication skill.

27 Claims, 3 Drawing Sheets

Step 1  Role Play By User In Response To Verbal Challenge

Step 2  Self-Review Of Response By User

Step 3  Remote Critique Of Response By Evaluator

Step 4  Critique Review By User

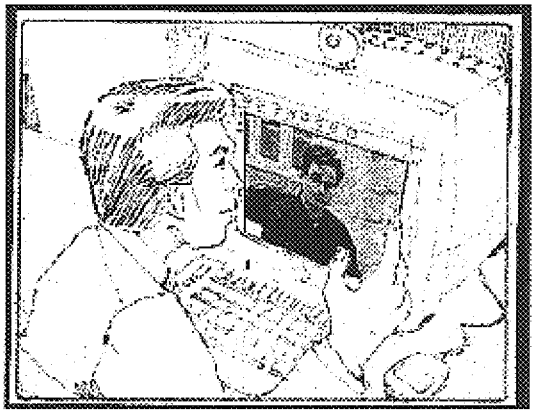
Step 1  Role Play By User In Response To Verbal Challenge
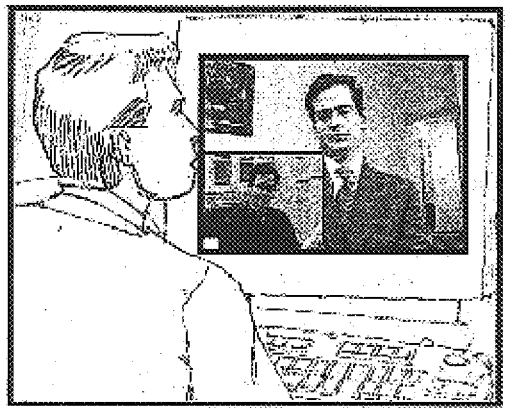
Step 2  Self-Review Of Response By User
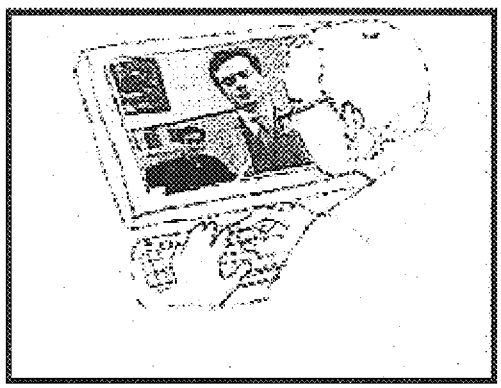
Step 3  Remote Critique Of Response By Evaluator
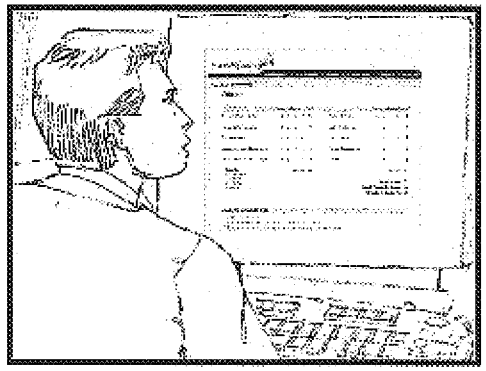
Step 4  Critique Review By User
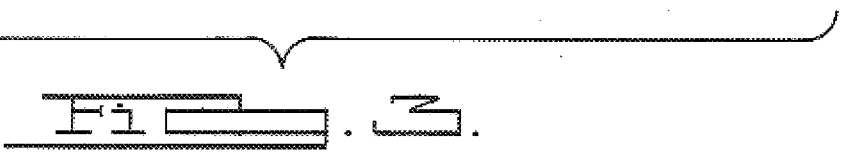

METHOD AND SYSTEM FOR INTERACTIVE COMMUNICATION SKILL TRAINING

RELATED APPLICATIONS

This application claims priority of U.S. Provisional Application Ser. No. 60/209,229 filed Jun. 2, 2000, entitled "Sure Speak" and U.S. Provisional Application Ser. No. 60/246,132 filed Nov. 6, 2000, entitled "Method and System for Interactive Communications Improvement Technology" which are incorporated herein by reference.

FIELD OF THE INVENTION

The present invention relates generally to verbal and nonverbal communication, and more particularly to a system and method of improving communication skills via an interactive, educational training tool.

BACKGROUND OF THE INVENTION

Organizations rely on the communication skills of their members to promote their goals and increase productivity. An organization, such as a business, will use communication training programs to educate their members, since verbal and nonverbal communication is a powerful tool. Various training programs are currently available to improve communication skills. Typically, these programs provide generic information to one or more students seeking to improve their communication skills. The information is generally presented in a variety of formats, including text-based materials to be read by the student, a lecture by a facilitator of the program, or a video.

Since many organizations are global, with many representatives located in diverse geographic regions, the traditional instructor-led training program is expensive to implement. It is advantageous for a training program to provide an opportunity for the user to verbally practice, review, and receive critique on the program materials presented to user, to ensure that the user comprehends the information provided and can apply the same in practice. Without an instructor present, the student has no basis on which to compare their performance with the provided information; and, therefore, presumes to apply the information correctly, when in fact the opposite may be true.

One effect of the explosive growth and acceptance of the internet, and in particular the Internet, is e-learning, or the teaching of a skill over the Internet. A disadvantage of present e-learning methodologies is the reliance on traditional classroom techniques, and the absence of an instructor to facilitate and evaluate role-play interaction. Thus, there is a need in the art for an interactive, multi-tiered system and method of teaching a communication skill that includes the steps of providing skills training; capturing a communications event; analyzing the communications event; and generating information based on the analysis.

SUMMARY OF THE INVENTION

Accordingly, the present invention is a system and method for interactive communication skill training. The system includes a user computer system having a memory, a display device, an input device, a video recording device and an audio device. The system also includes an e-learning web site with skill training software for interactively teaching a skill that is in communication with the user's computer system via a communications network. The system further includes an expert's computer system.

The method for interactive communication skill training includes the steps of accessing the e-learning web site by the user, selecting a learning module for a communication skill by the user, interacting with the learning module and recording the user interaction using the video recording device. The method also includes the steps of analyzing the user interaction by an expert and providing the expert analysis to the user via the communication network for review by the user to interactively learn the communication skill.

One advantage of the present invention is that a system and method for interactive communication skill training is provided that offers an effective communication improvement program presented in an interactive practice forum, thus enabling the student to master and apply the program concepts through repetitive practice and review of the presented techniques and strategies. Another advantage of the present invention is that the communication skill training program allows the student to interactively review practice sessions and receive instructor or computer-generated commentary relevant to the practice sessions. Still another advantage of the present invention is that an interactive, computer-based system is provided that enables development and improvement of communication skills utilizing an internet-based training environment. A further advantage of the present invention is that the communication skill training program is modular to customize the program for a particular audience; e.g., a corporation administers the program to its employees. Still a further advantage of the present invention is that the communication skill training program is available 24/7.

Other features and advantages of the present invention will be readily appreciated as the same becomes better understood after reading the subsequent description when considered in connection with the accompanying drawings.

BRIEF DESCRIPTION OF THE DRAWINGS

FIG. 3 is a block diagram of a method for interactive role playing, utilizing the method FIG. 2, according to the present invention.

DETAILED DESCRIPTION OF THE INVENTION

Figure 1:
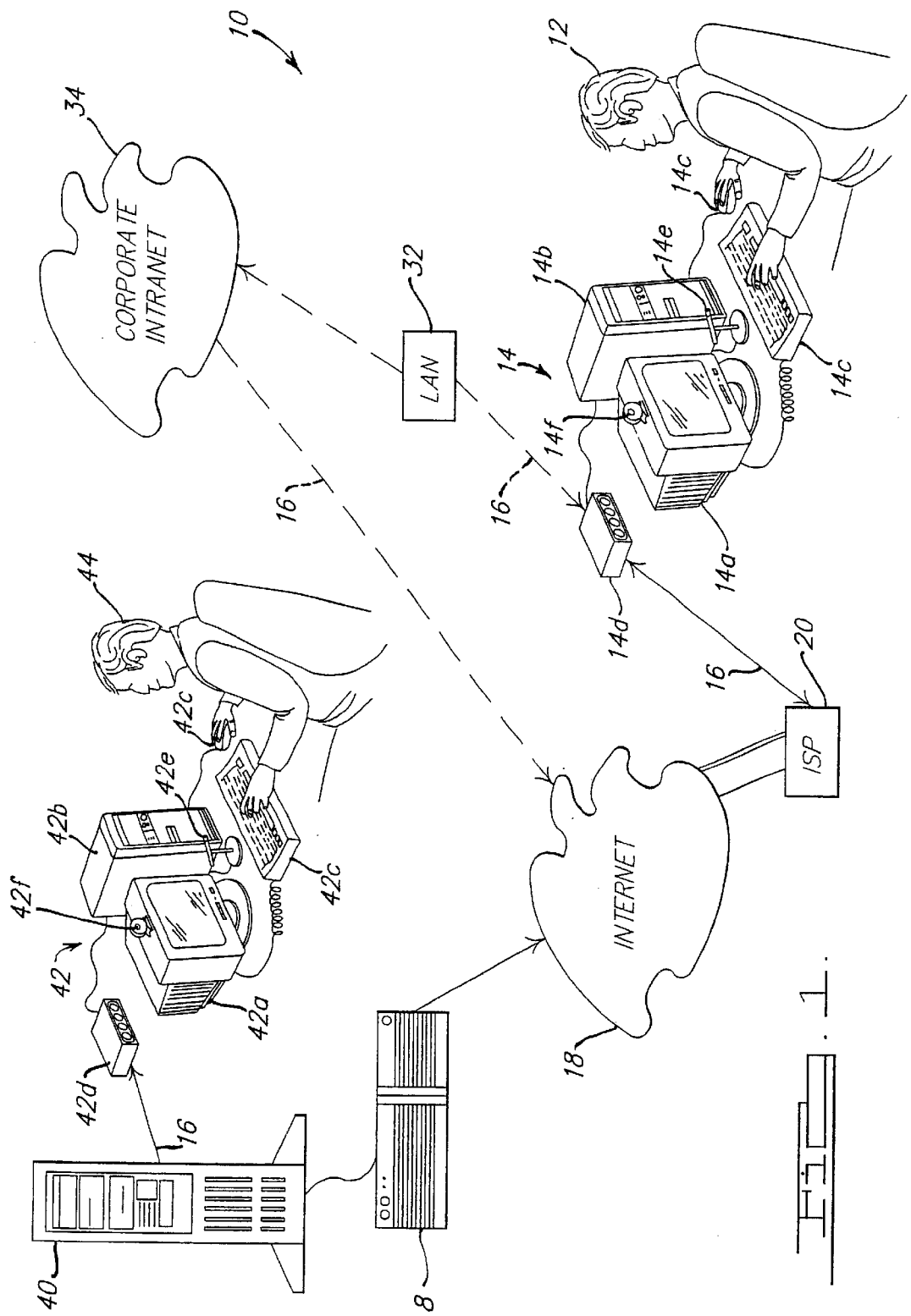
FIG. 1 is a block diagram of a system for interactive communication skill training, according to the present invention.

Referring to FIG. 1, an embodiment of a system for use with a method for interactive communication skill training is illustrated. The system 10 includes a user 12 having a computer 14. It should be appreciated that the user 12 can be an individual, corporation, or the like. The user's computer 14 includes a display device such as a video monitor 14a, a processor 14b, an input device 14c such as a keyboard or a mouse, a modem 14d, an audio device such as a microphone 14e, and a video recording device 14f, such as a web camera, as is known in the art. Advantageously, the web camera 14f provides both the user 12 and the evaluator the ability to evaluate soft communication skills, such as tone, body language and facial expressions.

The user's computer 14 is connected to the infrastructure of an internet, such as the Internet 18, via a telecommunication link 16, such as a telephone line or a cable line or a wireless connection. As is known in the art, the Internet 18 includes providers, such as Internet Access Providers (IAPs) (not shown), Internet Service Providers (ISPs) 20 and Network Service Providers (NSPs) (not shown) and routers 22 that provide wired and wireless digital telecommunications throughout the world using a TCP/IP networking protocol. It should be appreciated that the computer 14 may access the Internet 18 directly, or may be operatively connected to a Local Area Network (LAN) 32 over which information is transmitted to other computers on the same LAN 32 or to computers on other LANS 32 through a localized Intranet 34. The information can be transmitted between the user 14 and the Internet 18 via the Intranet 34.

The system includes an e-learning web site 40 having a server 36 that interactively communicates with the user 12 through the user's computer 14 via the Internet 18. Preferably, the e-learning web site maintains application software relating to the communication skill training program. The web site server 36 is a computer system operatively connected to a provider 20 in a conventional manner. The e-learning web site 40 provides for interactive communication between the host of the e-learning web site 40 and a visitor to the e-learning web site 40 via a communication link such as the Internet 18, an extranet (not shown), or an intranet 34. The communication is facilitated by a series of screens, referred to as pages, displayed on the display screen, with the first page referred to as a home page. When the user 12 visits the e-learning web site 40, the user 12 is served a page displayed on the video monitor 14a referred to as a home page. The user 12 may interact with the page via the input device 14c, such as by making a selection or a request.

The system 10 also includes a user identification system, whereby a computer 14 accessing the Internet 18 is assigned a unique user ID and IP (Internet Protocol) address. Preferably, the IP address is a specific sequence of numbers assigned to the user 12 for a specific provider 20. The IP address is temporarily assigned to the user 12 for the length of time the computer 14 is connected to the provider 20. Thus, transmission of data from the web site 40 through the provider 20 to the user's computer 14 in response to a request by the user 12, is addressed to the unique IP address associated with the provider 20 for the current connection to the Internet 18. It should be appreciated that this system 10 is conventional and known.

The system 10 also includes an expert's computer system 42 for use by an expert 44 in the communication skill being taught. Preferably, the expert 44 is associated with the e-learning website 40 as a facilitator or teacher. The expert's computer system 42 includes a video monitor 42a, a processor 42b, an input device 42c such as a keyboard or a mouse, a modem 42d, a microphone 42e, and a video recording device 42f, such as a web camera, as is known in the art. It should be appreciated that the expert's computer system 42 is in communication with the e-learning web site 40, in a manner previously described.

Figure 2:
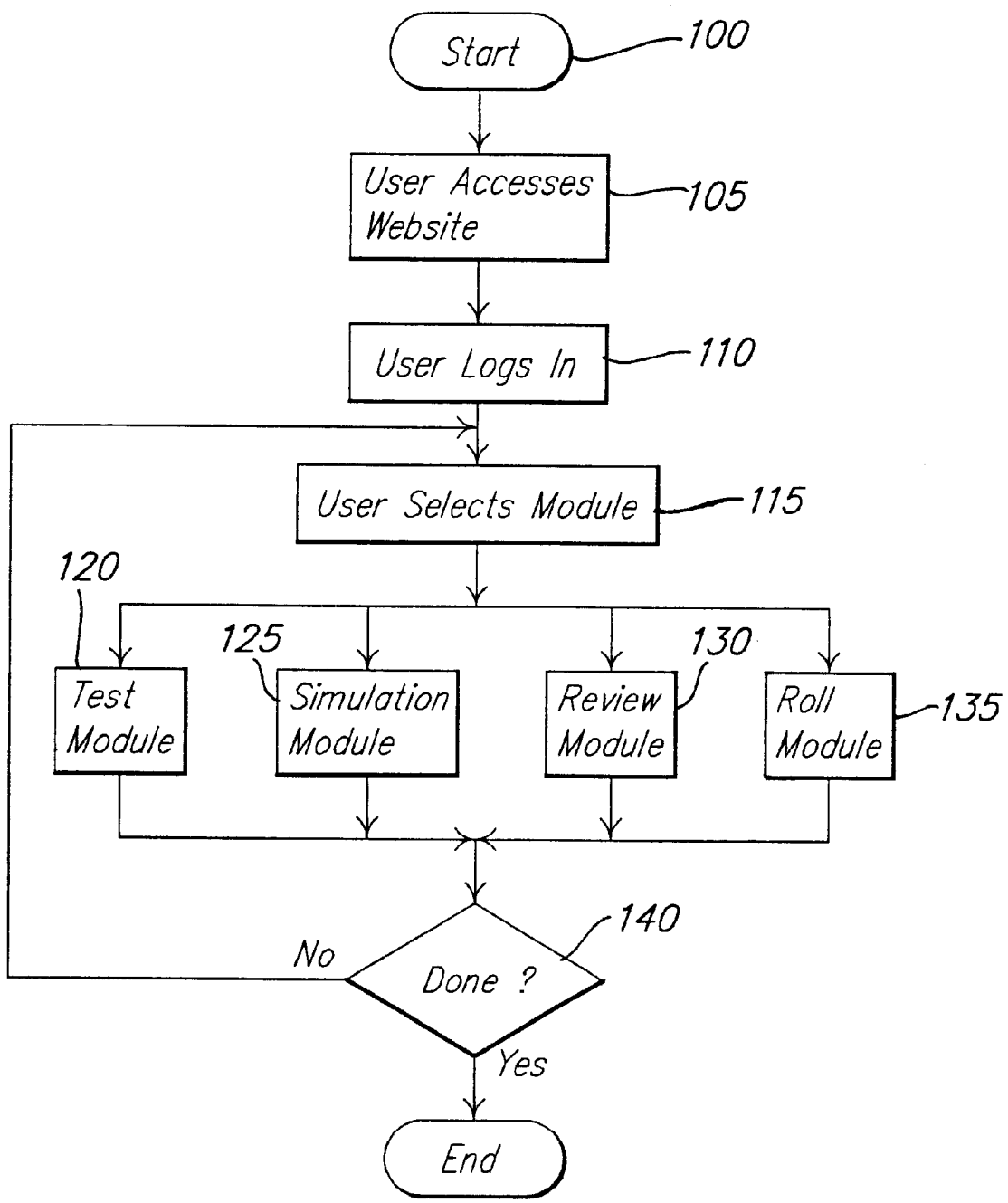
FIG. 2 is a flowchart of a method for interactive communication skill training, according to the present invention, utilizing the system of FIG. 1.

Referring to FIGS. 2 and 3, a method for interactive communication skill training is illustrated for a user 12 within the e-learning system 10 of FIG. 1. The method begins in block 100 and continues to block 105 with the user 12 accessing the e-learning web site 40 to learn a predetermined skill as part of a communication skill training program.

The method advances to block 110 and the user 12 is identified by the e-learning web site 40. For example, using a logging on process, the user 12 is prompted to provide an identification code and a password, as is known in the art. If the user 12 is new to the e-learning web site 40, the web site obtains information regarding the user 12. If the user 12 is not new to the web site 40, the web site retrieves data regarding the user 12.

Within a business environment, it is contemplated that an administrator of the training program will distribute one login and unique password code to each employee designated to participate in the program. In this manner, the administrator controls access to the e-learning web site server and its associated software. Once the employee receives the login and password code, the employee utilizes the browser on their computer system to access the e-learning web site 40, via the Internet 18. The e-learning web site 40 displays a web page on the user's video monitor 14a. The web page contains text fields for the login and password code. The employee utilizes the input device 14c of the computer system 14 to enter the login and password code assigned to them in the appropriate text field. Upon receipt of the login information, the e-learning web site server 40 and its associated software validate the login information, and initiate software related to the training program. The methodology advances to block 115.

In block 115, the user 12 selects a learning module from options presented on a web page. In this example, learning modules are part of a multi-tiered training program to teach sales related skills. Other types of communication skills training programs teach leadership and personal advancement skills. Preferably, the training program contains one or more learning modules for each skill to be mastered by the user. Within each training program, various skills are emphasized, and examples of sales related skills include selling the product, handling objections, closing the sale or dealing with competition. The leadership skills include employee counseling, interviewing, conflict resolution, hiring, firing, promotions given, promotions denied, promotions delayed, conducting effective meetings, and expatriate training. The simulated personal advancement situations include modules for creating workplace alliances, maximizing the supervisor—employee relationship, customer service, dating, understanding different cultures, and so forth. A particular skill is taught using one or more learning modules, such as a test module, a simulation module, a review module, and a role-play module.

If the user selects the test module, the methodology advances to block 120, and the test module is executed. In this example, the test module quizzes the user 12 through a multimedia format and solicits a response by providing questions to the user 12 in the form of an animated scenario of a simulated situation. The animation includes graphics, audio, other communications or the like, directed to the user 12 via the user's computer system 14. Upon completion of the scenario, the test module provides a number of multimedia vignettes representing various communications or responses to the scenario. The vignettes include multimedia images presented via the user's computer system 14.

The user 12 selects one of the vignettes in response to the interaction depicted in the previously displayed scenario, and enters the selection via the input device. The e-learning web site 40 and its associated software compares the entered selection with a predetermined correct response for that question, and provides the comparison results to the user 12 on the user's computer system 14. It should be appreciated that the comparison results will vary according the selection by the user 12. The methodology advances to diamond 140 and continues.

Returning to block 115, if the user selects the simulation module, the methodology advances to block 125. In block 125, the simulation module for the training program provides the user 12 with a simulation of a communication skill. For example, the e-learning web site 40 and its associated software display a web page containing graphics depicting humans with various facial expressions, and provides an explanation of the demonstrated expression associated with each, such as anger, happiness, etc. to educate the user 12 in visual, nonverbal communication cues. Similarly, the e-learning web site 40 plays sound bites on the user's computer system 14 with various tonal and inflection cues, and an interpretive explanation for each to improve verbal communication skills.

The simulation module further includes a variety of simulated situations designed to provide guidance in various situations. Preferably, the simulated situations are categorically organized in modules that focus on skills, such as improvements for selling the company, selling the product, handling objections, and selling against competition. As one skilled in the art will recognize, various embodiments incorporate various combinations of categories.

Communication strategies and techniques are presented with an explanation of each strategy or technique as well as a simulation of a scenario in which the featured strategy or technique is applied. For example, the program presents to the user 12 a communication strategy embodying a principle of "hop on the bandwagon". First, a textual explanation of the strategy is displayed on the screen informing the employee that "hop on the bandwagon" incorporates a technique utilized by sales persons to clinch sales whereby the sales person creates an impression with the potential buyer that safety exists in numbers, suggests that the proposed sale item is currently utilized by a large number of buyers, and implies, therefore, that the buyer would certainly be prudent in investing in such a widely-sold product. Next, the program plays an associated video clip depicting a conversation between a seller and a prospective buyer that includes each of the foregoing steps of the technique.

After viewing the scenario on the display device of the computer system 14, the training program displays a number of tasks for the user 12 to complete; i.e., provide a complete response to the situation depicted in the previewed scenario. The user 12 then faces the web camera 14f associated with the computer system 14 and articulates a response to the scenario. The web camera 14f captures the visual attributes of the user's communication, such as facial expressions. The microphone 14e captures the verbal portions of the response. The software associated with the user's computer system 14 transfers the captured data via the communications link to the e-learning web site 40.

Additionally, the e-learning web site 40 provides the captured data to a predetermined expert 44; e.g., an evaluator, a manager, or any other party so designated. For example, the e-learning web site 40 transfers the captured data to an expert 44 at the user's company for review. The expert 44 utilizes his computer system 42 to access the e-learning web site 40 via a communication link. The expert 44 views one or more web pages displaying the captured response as a video clip, analyzes the response, and provides feedback based on the analysis via email containing multimedia files of the expert's evaluation and recommendation to user 12. The user 12 receives the email, selects one or more files contained therein, and views and listens to the expert's comments contained in the file via the video monitor 14a and microphone 14e of the user's computer system 14.

In another embodiment, the e-learning web site 40 receives the captured data, and the software associated with the e-learning web site 40 analyzes portions of the response by utilizing, for example, voice-to-text software programs. The voice-to-text programs convert the audio data to textual data, which may then be compared to previously saved acceptable responses. The e-learning web site software generates information and recommendations based on the comparison, and forwards the same to the user 12.

It is contemplated that the software analyzes not only audio data and statements, as previously described, but also analyzes portions of the response germane to body language, tonal and inflectional response, body language response, content of the response, or a combination of the same. In one example, the software analyzes one response in terms of the same content with different tone and body language variables, thereby resulting in a different outcome for each change in the variables. After the user 12 completes the simulation module, the methodology advances to block 140 and continues.

Returning to block 115, if the user 12 selects a review module, the methodology advances to block 130. In block 130, the review module provides the user 12 with the opportunity to review previously completed learning modules. The review module incorporates communication input from various sources and in different formats, including the user 12, review and analysis of the input by the program software or an expert 42, and the results of such analysis. In this example, the user 12 receives an email containing a review of a skill, and the user 12 selects one or more files contained therein, and views and listens to the expert's comments contained in the file via the video monitor 14a and audio device 14e of the user's computer system 14. After the user 12 completes the review module, the methodology advances to block 140 and continues.

Returning to block 115, if the user 12 selects the role-play module, the methodology advances to block 135 and the role-play module is executed, as illustrated in FIG. 3. The role-play module provides communication enhancement instruction via interactive role-playing between the use 12 and an avatar 202, which is a computer generated image or video. In a first step, shown at 200, the user 12 will role-play to learn how to handle a predetermined situation. An example of a predetermined situation within a sales development program is a verbal challenge, such as how to handle an objection, how to close the sale, or how to obtain a referral. The user 12 selects a verbal challenge. Typically, the avatar will speak first to present the challenge and the user 12 responds. The user 12 is presented the verbal challenge using a multimedia format, such as video and audio. The user 12 formulates a response to the verbal challenge, and the user's response is recorded, visually and audibly, by the video recording device 14f in communication with the user's computer system 14.

In a second step shown at block 205, the user 12 self-reviews their response shown at 207 using a predetermined criteria. For example, the criteria may include a verbal communication skill such as tone of voice, or a nonverbal communication skill such as body language, or language content. It should be appreciated that the user 12 can perform and review the response 207 repetitively, until the user 12 is satisfied with the response 207. Advantageously, a safe environment is provided for the user 12 to practice a response and take risks in formulating a response to a predetermined scenario. Once the user 12 is satisfied with their response 207, the user 12 sends the response 207 to a predetermined expert 44. Preferably, the response 207 is sent to the expert 44 electronically, via the Internet 18, as previously described.

In a third step shown at block 210, the expert 44 reviews and critiques the user's response 207. In this example, the expert 44 receives the user's response on their computer system 42 from the e-learning web site 40. The expert 44 analyzes and critiques the user's response. Preferably, the evaluator's analysis follows a predetermined format. An example of a predetermined format is a list of criteria, such as product knowledge, competitive analysis, persuasiveness, tone of voice, eye contact, facial expression and posture, and a rating scale for each criterion. Thus the expert 44 reviews the user's response and assigns a rating to each criterion. It should be appreciated that the expert 44 can save a user's response on their computer system 42 for future use, such as an example of an exceptional response, or to highlight a particular mistake. Alternatively, the expert 44 can rerecord the user's response and include his oral comments for use by the user 12.

Preferably, the review is captured verbally, visually, or textually, and corresponds specifically to the video display. The interaction pauses at the point specific to the critique while the expert's critique is provided via voice, image, text or other means. When the critique on a specific point is complete, the interaction continues until the next point of critique, at which time the next point of critique is presented. At the end of the interaction, the expert 44 may also provide comments, recommendations, or other information to the user 12.

For example, the user 12 utilizes his computer system 14 to access the e-learning web site 40, and views a quiz containing a multimedia software scenario similar to the one described in the test module. The scenario depicts an actor engaged in a dialogue with the user 12. The actor in the scenario poses a question to the user 12, and the user 12 provides a response. The web camera 14f, microphone 14e, or other media devices associated with the computer system 14 captures the response. The program then integrates the interactive communications of the actor and the user 12, and displays the integrated scenario in a side-by-side visual format to the user 12. Alternatively, the program replays the captured response to the user 12 along with a prerecorded response by the actor in a side-by-side display format on the display unit of the computer system 14, thus providing the user 12 a real-time visual and audible perspective of their response, along with a visual and audible model response as an objective of the training program. Advantageously, the user 12 evaluates the differences in communication between their response and the model response to gain an understanding of the communication objective.

Alternatively, the expert 44 provides an evaluation of the differences as well as recommendations to meet the objectives to the user 12. The expert 44 provides the evaluation via a variety of methods including computer text file, email, and personal conversation. In yet another configuration, the side-by-side replay freezes at a point in time, and the software associated with the computer system 14 or the e-learning web site 40 displays a popup whiteboard window containing pointers to various portions in the frozen frame and associated comments.

To further enhance communication skills, the various tests for the user 12 are repeated and the user's responses to the tests are saved in a repository such as a database. The saved responses provide a benchmark for measuring progress upon subsequent evaluation of the user's communication skills.

In a fourth step shown at 215, the user 12 reviews the captured interaction, with the review being provided at the specific points during the interaction. Preferably, the response and critique can be saved on the user's computer system 14 for later reference. Advantageously, the user 12 is provided a safe environment to consider the expert's critique to facilitate the learning process. In addition, the user 12 can repetitively practice and receive coaching on one aspect of a particular skill.

It should be appreciated that user 12 may process several verbal challenges simultaneously. Also, there may be a time delay between the user 23 sending the response to the expert 44 and the expert 44 sending the critique back to the user 12. It is contemplated that the present invention incorporates fully scalable implementation technologies. The technologies include those presently available, such as artificial intelligence and voice recognition, as well as future technologies. The methodology advances to block 140.

In diamond 140, the user 12 determines whether to continue learning the skill through the training program. If the user 12 determines to continue the training program, the methodology returns to block 115 and continues. If the user 12 determines not to continue the training program, the methodology advances to block 145 and ends.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A system for interactive communication skill training of a plurality of users comprising:

a user computer system for each user having a processor, a memory, a display device, an input device, a video recording device and an audio device;

an e-learning web site, wherein said e-learning web site includes a computer system having a processor and a memory, and said e-learning web site includes an executable skill training software program for interactively providing each user the same skill training information using a skill challenge presented in a multimedia format through a plurality of fixed skill training modules, and said e-learning web site is in communication with each of the user's computer systems via a communication network;

an expert computer system having a processor, a memory, a display device, and an input device for an expert operatively in communication with said e-learning web site via the communication network; and wherein each of the users utilize their user computer system to selectively interact with the skill training information provided by the skill training module portion of the skill training software program displayed as a web page by the e-learning web site, record the user's response to the skill challenge using the video recording device and the audio device, transmit the user's response to said e-learning web site via the communication link for analysis by the expert using the expert computer system, and making the expert's analysis of each user's response available on the e-learning web site.

2. A system as set forth in claim 1 wherein the communication network is the Internet.

3. A system as set forth in claim 1 wherein the communication network is an intranet.

4. A system as set forth in claim 1 wherein said video recording device is a web camera.

5. A system as set forth in claim 1 where said audio device is a microphone.

6. A method for interactive communication skill training of a plurality of users, said method comprising the steps of:
   accessing an e-learning web site by each user utilizing a user computer system having a processor, a memory, a display device, an input device, a video recording device and an audio device, via a communication network wherein the e-learning website includes a server, and the server includes an executable communication skill software program having at least one fixed communication skill learning module that provides each user with predetermined skill training information and a predetermined skill challenge presented in a multimedia format;
   selecting a communication skill learning module by each user;
   interacting with the learning module skill training information by each user wherein the user is presented with a predetermined skill challenge and the user responds to the predetermined skill challenge;
   recording the user's response to the predetermined skill challenge by the video recording device;
   transmitting the recorded user's response to the predetermined skill challenge to the e-learning web site;
   analyzing the recorded user's response by an expert using an expert computer system that is operatively in communication with the e-learning web site and having a processor, a memory, a display device, and an input device and communicating with the e-learning web site via the communication network; and
   making the expert analysis of the user's response available on the e-learning website via the communication network.

7. A method as set forth in claim 6 further including said step of identifying the user accessing the e-learning web site.

8. A method as set forth in claim 6 wherein said learning module is a test module, and the e-learning web site provides a web page on the user computer system for measuring the user's knowledge of a predetermined communications skill using a multimedia format.

9. A method as set forth in claim 6 wherein said learning module is a simulation module, and the e-learning web site provides a web page on the user's computer system containing a simulated demonstration of a predetermined communication skill using a multimedia format.

10. A method as set forth in claim 6 wherein said learning module is a role-play module, and the user is presented a predetermined verbal challenge using a multimedia format, the user responds to the verbal challenge, the user self-reviews their response to the verbal challenge using a predetermined criteria and transmits the user's response to the expert's computer system via the communication network.

11. A method as set forth in claim 6 wherein said step of analyzing the interaction by the expert includes the expert comparing the user's response to a predetermined format for evaluating the communication skill.

12. A method as set forth in claim 6 wherein said step of providing the expert analysis includes the step of providing the expert analysis together with the recorded user's response to the user on the user computer system.

13. A method for interactive communication skill training of a plurality of users, said method comprising the steps of:
   accessing an e-learning web site by each user utilizing a user computer system having a processor, a memory, a display device, an input device, a video recording device and an audio device, via a communication network wherein the e-learning web site includes a server and the server includes an executable communication skill software program having at least one fixed communication skill learning module that provides each user with predetermined skill training information and a predetermined skill challenge in a multimedia format;
   identifying the user accessing the e-learning web site;
   selecting, by the user, a communication skill learning module for interactive communication skill training on the e-learning web site, wherein the learning module provides each user with identical communication skill training information using a multimedia format on the user computer system;
   interacting with the learning module skill training information by the user wherein the user is presented with a predetermined verbal challenge and the user responds to the verbal challenge;
   recording the user's response to the verbal challenge using the video recording device;
   transmitting the recorded user's response to the predetermined verbal challenge to the e-learning web site, from the user computer system via the communication network;
   analyzing the recorded user's response to the verbal challenge by an expert using an expert computer system that is operatively in communication with the e-learning web site, and having a processor, a memory, a display device and an input device; and
   providing the expert analysis of the user's response to the verbal challenge to the e-learning web site via the communication network.

14. A method as set forth in claim 13 wherein said learning module is a test module, and the e-learning web site provides a web page on the user computer system for measuring the user's knowledge of a predetermined communications skill using a multimedia format.

15. A method as set forth in claim 13 wherein said learning module is a simulation module, and the e-learning web site provides a web page on the user's computer system containing a simulated demonstration of a predetermined communication skill using a multimedia format.

16. A method for interactive communication skill training of a plurality of users, said method comprising the steps of:
   accessing an e-learning web site by each user utilizing a user computer system having a processor, a memory, a display device, an input device, a video recording device and an audio device, via a communication network wherein the e-learning web site includes a server and the server includes an executable communication skill software program having a predetermined communication skill learning module that provides the user with predetermined skill training information and a predetermined verbal challenge using a multimedia format and is stored on the server;
   identifying each user accessing the e-learning web site;
   selecting, by the identified user, a predetermined communication skill learning module for interactive communication skill training on the e-learning web site;
   interacting with the learning module skill training information by the user wherein said learning module is a role-play module, and the user is presented a predetermined verbal challenge, the user responds to the verbal challenge, and the user self-reviews their response to the verbal challenge using a predetermined criteria;

recording the user's response to the verbal challenge using the video recording device;

transmitting the user's response to the verbal challenge to the e-learning web site, from the user computer system via the communication network;

analyzing the user's response to the verbal challenge by an expert using an expert computer system; and providing the expert analysis of the user's response to the verbal challenge to the e-learning web site via the communication network and the expert analysis is accessible to the user through the e-learning website.

17. A method as set forth in claim 16 wherein said step of analyzing the interaction by the expert includes the expert comparing the user's response to a predetermined format for evaluating the communication skill.

18. A method as set forth in claim 16 wherein said step of providing the expert analysis includes the step of providing the expert analysis together with the recorded user's response to the user on the user computer system.

19. A method as set forth in claim 16 wherein said learning module also includes a test module, and the e-learning web site provides a web page on the user computer system for measuring the user's knowledge of a predetermined communications skill using a multimedia format.

20. A method as set forth in claim 16 wherein said learning module also includes a simulation module, and the e-learning web site provides a web page on the user's computer system containing a simulated demonstration of a predetermined communication skill using a multimedia format.

21. A method of communication skill analysis of a predetermined communication skill of a user through an interactive computer-based communication skill analysis software program, said method comprising the steps of:

accessing a web site maintained on each server, by a user, via a communication network, wherein the server includes the executable communication skill analysis software program, and the server is operatively in communication with a user computer system having a processor, a memory, a display device, an input device, a video recording device and an audio device;

selecting a communication skill analysis module from the communication skill analysis software program, wherein the communication skill analysis module provides each user with predetermined skill analysis information and a predetermined skill challenge using a multimedia format;

interactively responding by the user to the skill analysis information and the skill challenge provided by the communication skill analysis module;

recording the interactive response of the user to the skill challenge by the video recording device;

transmitting the user's recorded response to the web site;

reviewing the user's recorded response to the predetermined skill challenge by an expert using an expert computer system that is operatively in communication with the server via a communications network; and making the expert review available on the server.

22. A method as set forth in claim 21 wherein said step of reviewing the user's response by the expert includes the expert comparing the user's response to a predetermined format for evaluating the communication skill.

23. A method as set forth in claim 21 wherein said step of making the expert analysis available includes the step of providing the expert analysis together with the recorded user's response to the skill challenge to the user on the user computer system.

24. A method as set forth in claim 21 is a predetermined test module, and the e-learning web site provide a web page on the user computer system that measures the user's knowledge of a predetermined communications skill using a multimedia format.

25. A method as set forth in claim 21 is a predetermined simulation module, and the e-learning web site provides a web page on the user's computer system containing a simulated demonstration of a predetermined communication skill using a multimedia format.

26. A method as set forth in claim 21 further comprising a role-play module for interactive role play between the user and an avator, and the user is presented a predetermined verbal challenge by the avator using a multimedia format, the user responds to the verbal challenge, the user self-reviews their response to the verbal challenge using a predetermined criteria and transmits the user's response to the expert's computer system via the communication network.

27. A method of communication skill analysis of a predetermined communication skill of a user through an interactive computer-based communication skill analysis software program, said method comprising the steps of:

accessing a web site maintained on each server, by a user, via a communication network, wherein the server includes the executable communication skill analysis software program, and the server is operatively in communication with a user computer system having a processor, a memory, a display device, an input device, a video recording device and an audio device;

selecting a communication skill analysis module from the communication skill analysis software program, wherein the communication skill analysis module is provided by the e-learning web site as a web page on the user's computer system using a multimedia format and includes a predetermined simulation module containing a simulated demonstration of a predetermined communication skill, or a role-play module for interactive role play between the user and an avator, or a predetermined test module that measures the user's knowledge of a predetermined communications skill,;

interactively responding by the user to the skill analysis information and the skill challenge provided by the communication skill analysis module;

recording the interactive response of the user to the skill challenge by the video recording device;

transmitting the user's recorded response to the web site;

reviewing the user's recorded response to the predetermined skill challenge by an expert using an expert computer system that is operatively in communication with the server via a communications network, wherein the expert compares the user's response to a predetermined format for evaluating the communication skill; and making the expert review available on the server.

* * * * *